united States Patent Office
3,461,191
Patented Aug. 12, 1969

3,461,191
ELASTIC INSULATING BODIES OF INORGANIC FIBER MATERIAL AND METHOD OF PRODUCING SUCH BODIES
Ralph David Dale, Shamley, Green, Surrey, England, assignor, by mesne assignments, to Protex Corporation Limited, New Nassau, Bahama Islands, a corporation of the Bahama Islands
No Drawing. Filed Sept. 17, 1965, Ser. No. 488,235
Int. Cl. B29d 27/04
U.S. Cl. 264—41                                16 Claims

ABSTRACT OF THE DISCLOSURE

An elastically compressible dry foam material is made by dispersing fibrous asbestos in a liquid, foaming the dispersion, molding the foamy dispersion, and then drying it at 40 to 100° C. Subsequent tempering above 200° C. results in a bulk-elastic material of 0.002 to 0.3 g./cm.$^3$ specific gravity which is heat and sound insulating, non-flammable and chemically stable.

---

My invention relates to porous and elastically flexible insulating bodies consisting substantially of inorganic fiber material and to methods of producing such bodies.

It has long since been known to produce shaped insulating bodies of foam material, particularly organic material such as synthetic plastic. As a rule, a distinction is made between rigid foam bodies, the so-called hard foams (for example polysterene) and flexible, sponge-like products (foam rubber). None of these foam bodies, however, exhibits a satisfactory thermal stability. Even if the skeleton substance itself is not inflammable, it deteriorates under the effect of elevated temperatures by embrittling or melting, depending upon the kind of organic skeleton material being employed, and ultimately becomes decomposed and carbonized.

It has been attempted to minimize the thermal sensitivity of such foam bodies by employing inorganic skeleton materials (foam concrete, cell concrete and the like). However, such products in comparison with the known organic products exhibit an excessively high specific gravity and completely lack the desired flexibility.

Solving thermal insulation problems therefore has involved the predicament of either employing organic foam bodies favorable as to specific gravity and elasticity but unfavorable as to thermal stability, or resorting to foam bodies of the inorganic type, thus achieving thermal stability at the expense of a disadvantageously high specific gravity and a virtually absent elasticity.

Generally, the use of structural bodies of one or the other type of foam material has the advantage that these materials are readily accessible and that a large number of methods are available of producing various foam bodies in any desired shapes.

It is an object of the invention, therefore, to provide insulating foam bodies of any desired shape which are free of the above-mentioned disadvantages heretofore encountered with such bodies and hence are not inflammable, exhibit sufficient elasticity and sufficient thermal stability, do not tend to embrittle and/or do not have an excessively high specific gravity.

I have discovered that porous, flexible and bulk-elastic and non-inflammable, shaped insulating bodies consisting substantially only of inorganic fibers can be produced in an extremely simple manner by first preparing a foamy dispersion of asbestos fiber material, then molding the dispersion to the desired shape, and then solidifying the molded product to obtain the shaped elastic body.

It is known to employ asbestos fibers as an admixture in the production of shaped insulating bodies. Generally, however, the bodies heretofore produced in this manner constituted rigid porous structure on silicate or hydraulic base in which the asbestos fibers are contained as reinforcing inclusions. Further known are bodies made of mixtures of rock-wool and cellulose fibers with silicate binding agents, but these have the disadvantage of being partially inflammable, aside from exhibiting an unsatisfactory elasticity.

I have found that by virtue of the above-described method according to the invention, employing otherwise conventional foaming processes, there result shaped insulating bodies which, for example in the temperature range of —100° up to more than +550° C., exhibit no fatigue phenomena even under continuous stress. Furthermore, the insulating bodies made according to the invention possess an extremely low specific gravity, for example between 0.002 and 0.03, preferably between 0.005 and 0.01 g./cm.$^3$.

The method according to my invention is preferably performed by preparing dispersions of asbestos fibers, preferably aqueous dispersions, in which the asbestos material is largely dissociated down to the individual fibers or down to bunches comprising only a few individual fibers. The preparation of such dispersions is preferably effected by first wetting the asbestos fiber material, then foaming or swelling the wetted fibers, and thereafter adding into the swelled asbestos fiber material, the agents required for complete dispersion and foaming. In material whose fibers, for example, have been individualized down to a diameter above 10$\mu$ approximately, has been found to be well suitable. Especially favorable have been found masses in which the main quantity of the fiber bunches has a diameter of about 20 to 100$\mu$, although bunches of larger thickness of up to 200 or 300$\mu$ are likewise applicable.

Applicable to advantage are additional mineral fibers such as rock-wool fibers, glass fibers and similar materials. Suitable, for example, is rock wool produced from talc as available in the trade under the name "Silanwolle." Further suitable is spun glass made alkali-free by application of acid and heat, such a glass material being available in the trade under the name "Refrasil."

Virtually all kinds of asbestos, including those of inferior quality, are suitable, for example chrysotile-asbestos 3R, Cassiar A, AA, AK, CuG3, TC299, blue asbestos Cape C and D. Relative to these various kinds of asbestos, reference may be had to "Handbook of Asbestos Textiles," second edition, Asbestos Textile Institute, Dr. Myril C. Shaw, secretary, Schoolhouse Lane, Philadelphia 44, Pa.

As mentioned, conventional foaming processes may be used for producing the insulating shaped bodies according to the invention.

In general, the dispersion of the asbestos fibers or of the asbestos-containing mixture of inorganic fibers (dispersion of fine fiber bunches or individual fibers) is mixed together with a foaming medium, and the dispersion is then converted to foam. Preferably used as dispersion medium is water, or preparations which contain water, for example a mixture of water with organic water-soluble liquids such as alcohol, or water mixed with liquids which form an emulsion. Also applicable, however, are water-free organic liquids. In each case the dispersion medium may contain other organic or inorganic auxiliary agents.

Suitable as organic water-soluble substances for use in the dispersion are alcohols such as methanol and ethanol. The alcohols added to the aqueous dispersion serve, on the one hand, to give the foam finer and more uniformly distributed pores and, on the other hand, to reduce the energy required for subsequently evaporating the water. Suitable as emulsifying substances to be added to the dispersion are low-boiling liquids, for example dichlordifluormethane.

The purpose of adding an emulsifying substance is the following. When this substance is added to the dispersion of asbestos fibers at low temperature and under pressure, and the entire mixture slightly foamed, the mixture can be filled into pressure containers such as bottles. When thereafter the foam is released from the pressure bottle through a reduction valve at normal room temperature, the low-boiling, volatile substance causes a great amount of foaming which facilitates employing the resulting foam in situ.

Other organic or inorganic auxiliary agents which may be added to the dispersion medium are, for example, the following.

Inorganic additions:
Graphite.
Perlite.
Vermiculite.
Kieselguhr.

Organic additions:
Teflon.
Synthetic resins, epoxide resins, phenol formaldehyde resins and melamine resins.
Styrene.

Such further inorganic or organic additions serve the following purposes. The inorganic auxiliary additions as well as Teflon, serve as fillers which increase the specific gravity of the foam material. Synthetic resins permit rendering the resulting foam material hydrophylic or adding a pressing operation to obtain shaped insulating bodies which are resistant to high temperature. Styrene with an addition of catalysts can be polymerized at temperatures between 60 and 100° C. Foam-promoting additions to the dispersion may consist of soaps, for example salts of fatty acids, particularly alkali salts of fatty acids, such as sodium stearate or sodium oleate, and other known foaming agents. The ratio of fiber material to foam-forming material is generally kept between 10:1 and 1:1 (all parts are by weight). Preferred is the range of approximately 5:1 to 2:1 and particularly a fiber/foaming-agent ratio of about 3:1. It has been found advantageous to add alkarylsulfonates, such as alkylbenzenesulfonate, alkylnaphthalensulfonate and similar compounds. Added to the dispersion in such cases are either non-ionic interlinking or wetting agents or ionic agents whose charge is preferably opposite that of the asbestos fiber; that is when chrysotile asbestos is being used, the addition should be anionic and when blue asbestos is used, the addition should be cationic. In most cases, the wetting or interlinking agent is added in quantities of 1 to 10%, preferably 3 to 7%, by weight relating to the weight of the fiber material.

Suitable as anionic addition according to the foregoing are for example the following materials:

The material available in the trade under the name "Rapidnetzer," consisting of sodium sulfonate or succinic acid; or Duponal, consisting of sodium lauryl sulfate; or Ruco-Netzer, consisting of sodium salts of the fatty alcohol-sulfates.

Applicable as the above-mentioned cation-active addition is the material available in the trade under the name Repelat D, consisting of laurylpyridiniumsulfonate or triethyllaurylammoniumchloride.

Suitable as non-ionic additions are polyglycolether derivatives, for example palmitylpolyglycolether or stearylpolyglycolether.

I have found that the asbestos fiber dispersion can also be foamed satisfactorily without adding any soap, that is by adding only Duponal or Ruco-Netzer, for example.

In most cases the dispersion bath employed contains 0.5 to 8%, preferably 1 to 5% by weight of fibers relative to the weight of the dispersion medium, particularly water, even though higher concentrations of fiber materials are likewise applicable. Conventional industrial water is applicable. Hard water, for example with a hardness of 13–16° and more, has been found particularly favorable. The degree of hardness is here given in German graduations (° dH). A German degree of hardness (1° dH) corresponds to 10 mg. CaO in 1 liter $H_2O$. 1° dH=1.79° French hardness=1.25° English hardness. The German hardness scale is in accordance with the German industrial standard according to DIN-Standards Nos. 8101–8106.

The conversion of the suspension to foam is effected by stirrers, by blowing gas through the dispersion, by pumping, beating and other foam-producing means. The pore size and thus the insulating properties are determined by the kind of foaming agent used, by the particular foaming process employed and also by the ripening periods. The size of the foam cells may also be controlled or modified in known manner by length of the processing time, the drying temperature (a lower temperature produces smaller pores), and by a combination of such expedients.

The resulting foam can be shaped in any suitable manner. For example, it may be cast into molds. Injection molding is likewise applicable. The foam may further be sucked by vacuum into a mold. It may be trowelled or centrifugally flung into a mold. Another way of shaping is to impregnate the foam with synthetic resin and then mold the bodies in any suitable manner. A further possibility is to employ as a mold a structure to be insulated. In this case, the foam material is placed upon the structure to be insulated and is solidified in contact with and adherence to the structure.

The solidification of the foam after shaping is likewise effected in known manner in dependence upon the foaming process used. The solidification may be modified or controlled by employing suitable hardeners or bonding agents which in some cases may be added already to the dispersion of the asbestos fiber. Thus, for example, synthetic plastic material such as silicone resin may be entered into the dispersion of asbestos fibers before stirring the dispersion to a foamy mass and processing it as described above. The addition of synthetic resins mainly serves to provide uniform pores in the foam, but also affords making the finished asbestos-foam material hydrophobic.

The resulting solidified bodies of foam may thereafter be subdivided in any desired manner, for example by cutting or sawing, or the shaped body may be used as it comes out of the mold. Particularly favorable insulating qualities are obtained when care is taken to have the individual cells in the foam closed and sealed so that virtually no exchange of gas takes place between the individual cells. This effect is achieved for example when employing soaps as foaming agents (alkali salts of fatty acids) with dispersions of asbestos fibers.

By employing the above-described starting materials and processing steps, I have succeeded in producing shaped insulating bodies which for all technological purposes consist only of asbestos fibers, i.e., are virtually free of bonding agents. This flexible bulk-elastic material may contain slight quantities of the auxiliary agents employed for producing the dispersion. Any such trace amounts however do not affect the behavior of the products made according to the invention as to their inorganic asbestos qualities.

Of course, if desired, the products according to the invention may be charged with other substances during or after the production process. For example, bonding agents or fillers may be added. However, in contrast to the known asbestos-containing shaped bodies of insulating materials in which the presence of considerable amounts of bonding agents is indispensable, such additions are not necessary for products made according to the invention.

After formation and shaping of the foam material, the foam body is dried, for example at 40 to 100° C. It may then be subjected to further heat treatment at higher temperature, preferably at an approximate minimum temperature of about 200° C. This makes it possible to arrive at a flexible material in which the foam-forming agents, which prior to the heat treatment may have amounted to a few percent by weight, for example 5% relative to the asbestos, are partially destroyed and partially driven out of the material by diffusion, so that ultimately only negligible traces will remain. The subsequent heating may result in the occurrence of some reactions between the inorganic skeleton fiber and the substances employed for foam formation, thus permitting a modification of the fiber properties in a desired manner. The thermal after-treatment may also be effected in situ. This is preferable particularly in cases where the foam material is deposited upon a structure to be insulated and is then solidified while adhering to the structure.

Insulating shaped bodies according to the invention are applicable in all cases where insulating structures are to be subjected to a large range of temperatures and are required to have only slight weight, to be substantially not inflammable or also acoustically of good sound-suppressing properties. Insulating bodies according to the invention are therefore particularly well applicable for airplane, rocket, vehicle, house and ship construction, also as insulating material for refrigerating, air-conditioning and the like purposes. Described in the following are typical examples.

Introductory remarks to Examples 1 to 6

The following examples of compositions Nos. 1 to 6 can be processed in the same manner. It therefore appears helpful to first describe the processes applicable with these examples.

The mixtures specified under each of Examples Nos. 1 to 6 are stirred or beaten in a vessel until converted to foam. This is done with the aid of a medium-speed stirrer mechanism or also by means of a circulation pump. The foam is cast into molds and thereafter dried. The casting operation in each case may be greatly facilitated by sucking the foam into the evacuated mold so that the foam will adhere to the mold walls on which it is dried. The foam material of each Example 1 to 6 may also be deposited in situ by spackling or by spraying it from a pressure container onto a base or support to which the finished product is to remain adherent.

The foam in the molds or in situ is dried at temperatures between 50 and 150° C. The product thus obtained from the mixtures according to Examples 1 to 6 has a specific gravity of approximately 0.002 to 0.03 kg./dm.$^3$. It exhibits excellent heat-insulating and sound-insulating property, is bulk-elastic and flexible. In this constitution the foam may be used as a finished product although it still contains slight residues of the organic additions.

However, the completely dried foam material may be additionally subjected to high-temperature treatment. The temperatures preferably employed are above 200° C., and the treatment is effected in a steam atmosphere to prevent oxidation of the organic constituents. Any organic substances, such as interlinking and foaming agents, as may still be contained in the dried foam, are eliminated by the high-temperature treatment down to negligible traces. It has been found that the high-temperature treatment need not necessarily be effected in a steam atmosphere. It suffices to temper the dried foam in normal atmosphere. However, the temperature treatment in steam offers the advantage that the organic substances can be reclaimed in this manner, whereas they oxidize when tempering in normal atmosphere.

The product resulting from the subsequent tempering at high temperature consists substantially of pure asbestos only. In addition to the properties already mentioned above (namely, a specific gravity between 0.002 and 0.3 g./cm.$^3$ heat- and sound-insulating qualities and bulk-elastic flexibility), the product is no longer flammable, chemically stable, non-meltable and free of odor. It can be employed in temperature ranges below 0° up to +550° C.

EXAMPLE 1

|  | Grams | Percent | Ratio of asbestos to foaming agent |
|---|---|---|---|
| Chrysotile Asbestos 3R | 1,110.0 | 1.83 | 2.5:1 |
| Soap (sodium stearate) | 444.0 | 0.73 |  |
| Anionic linking agent (sulfonic ester of succinic acid) | 66.6 | 0.11 |  |
| Water 13° dH | 58,000.0 | 95.68 |  |
| Methanol | 1,000.0 | 1.65 |  |
|  | 60,620.6 | 100.00 |  |

EXAMPLE 2

|  | Grams | Percent | Ratio of asbestos to foaming agent |
|---|---|---|---|
| Chrysotile Asbestos 3F | 600.0 | 1.92 | 1:1 |
| Soap (sodium oleate) | 600.0 | 1.92 |  |
| Non-ionic emulsifier: Palmitypolyglycolether or stearicacidpolyglycolether | 80.0 | 0.26 |  |
| Water 20° dH | 30,000.0 | 95.90 |  |
|  | 31,280.0 | 100.00 |  |

EXAMPLE 3

|  | Grams | Percent | Ratio of asbestos to foaming agent |
|---|---|---|---|
| Blue Asbestos Cape C | 227.0 | 1.53 | 2.05:1 |
| Soap (sodium stearate) | 111.0 | 0.75 |  |
| Cationic linking agent: Triethyllaurylammoniumchloride | 16.7 | 0.11 |  |
| Water 16° dH | 14,500.0 | 97.61 |  |
|  | 14,854.7 | 100.00 |  |

EXAMPLE 4

|  | Grams | Percent | Ratio of asbestos to foaming agent |
|---|---|---|---|
| Chrysotile Asbestos 3K | 600.0 | 2.42 | 3:1 |
| Anionic active linking agent: Duponal (sodium laurylsulfate) | 200.0 | 0.81 |  |
| Water 20° dH | 24,000.0 | 96.77 |  |
|  | 24,800.0 | 100.00 |  |

EXAMPLE 5

|  | Grams | Percent | Ratio of asbestos to foaming agent |
|---|---|---|---|
| Chrysotile Asbestos Cassiar A | ca. 300.0 | 0.51 | 13.5:1 |
| Mineralwool | ca. 600.0 | 1.02 |  |
| Ruco-Netzer: (Sodium salt of a fatty alcohol sulfate) | 66.6 | 0.11 |  |
| Water 13° dH | 58,000.0 | 98.36 |  |
|  | 58,966.6 | 100.00 |  |

EXAMPLE 6

|  | Grams | Percent | Ratio of asbestos to foaming agent |
|---|---|---|---|
| Chrysotile Asbestos 3F | 600.0 | 2.24 | 4.8:1 |
| Soap | 125.0 | 0.47 |  |
| Rapidnetzer (Sulfonic ester of succinic acid) | 75.0 | 0.28 |  |
| Water 15° dH | 26,000.0 | 97.01 |  |
|  | 26,800.0 | 100.00 |  |

EXAMPLE 7

|  | Grams | Percent | Ratio of asbestos to foaming agent |
|---|---|---|---|
| Chrysotile Abestos 3F | 600.0 | 2.41 | 2.5:1 |
| Anionic linking agent: Duponal (sodium laurylsulfate) | 250.0 | 1.00 | |
| Dichlorodifluoromethane (available as Freon or Frigene) | 60.0 | 0.24 | |
| Water 15° dH | 24,000.0 | 96.35 | |
|  | 24,910.0 | 100.00 | |

This mixture is especially designed to be filled into pressure bottles. The mixture is first stirred at a pressure slightly above atmospheric and at a temperature only slightly above normal room temperature, until it has a somewhat foamy constitution. The mixture is then filled into the pressure bottles. When the mixture is released through the reduction valve of the bottle at normal room temperature, the low-boiling dichlorodifluoromethane causes the mixture, as it issues from the valve, to be subjected to intensive foaming. The foam can thus be deposited upon any desired support into a mold.

EXAMPLE 8

If the foam material is to be polymerized, the following mixture, for example, is suitable:

|  | Grams | Percent | Ratio of asbestos to foaming agent |
|---|---|---|---|
| Chrysotile Asbestos 3F | 600.0 | 2.39 | 3:1 |
| Sodium laurylsulfate | 200.0 | 0.80 | |
| Vinylbenzene | 300.0 | 1.19 | |
| Catalyst: (Benzeneperoxide) | 6.0 | 0.02 | |
| Water 15° dH | 24,000.0 | 95.60 | |
|  | 25,106.0 | 100.00 | |

The mixture is foamed and molded or processed in situ as described in the introductory remarks to Examples 1 to 6. Thereafter the polymerization is effected by heating the foam at a stepwise increased temperature between 65° and 100° C. The dried foam product is still flexible and can be molded and pressed to highly heat-resistant shaped bodies of low specific gravity.

EXAMPLE 9

The following mixture is suitable to be pressed to shaped bodies of extreme resistance to heat:

|  | Grams | Percent | Ratio of asbestos to foaming agent |
|---|---|---|---|
| Chrysotile Asbestos 3K | 600.0 | 2.41 | 4.6:1 |
| Sodium oleate | 130.0 | 0.52 | |
| Ester of sulfo-succinic acid | 80.0 | 0.32 | |
| Water 16° dH | 24,000.0 | 96.15 | |
| Melamine-formaldehyde polycondensate | 150.0 | 0.60 | |
|  | 24,960.0 | 100.00 | |

After foaming, the mass is dried in molds at temperatures between 60° and 130° C. The dried foam material is still flexible and can be pressed to hard-shaped bodies of extreme resistance to heat, particularly suitable for electrical purposes on account of their good insulating qualities.

I claim:

1. The method of producing a dry, porous and bulk-elastic insulating foam material of inorganic fibers, which comprises dispersing fibrous asbestos in liquid dispersion medium, converting the resulting dispersion to a foam still containing the fibers in the dispersed state, molding the foam of fibrous asbestos, and drying the molded foam to obtain the bulk-elastic material.

2. The method according to claim 1, wherein the asbestos comprises fibers and bunches having a diameter above $10\mu$.

3. The method according to claim 1, wherein the asbestos comprises fibers and bunches having a diameter of about 20 to about $100\mu$.

4. The method according to claim 1, which comprises admixing other mineral fibers to the asbestos fibers and dispersing the mixture in said liquid dispersion medium.

5. The method of producing porous and bulk-elastically flexible insulating bodies of inorganic fiber material, which comprises dispersing an asbestos-containing mineral fiber material in an aqueous dispersion medium containing a foam-promoting addition, foaming the resulting dispersion, molding the foam to the shape of the insulating body while the foam still contains the fiber material in dispersion, and drying the molded foamy dispersion.

6. The method according to claim 5, wherein said dispersion medium contains soap or detergent.

7. The method according to claim 5, which comprises solidifying the molded foam by subjecting it to drying below 100° C. and to subsequent heating at higher temperature.

8. The method according to claim 5, which comprises solidifying the molded foam by subjecting it to drying at a temperature of 40 to 100° C. and to subsequent heating at a minimum temperature of approximately 200° C.

9. The method according to claim 5, wherein said inorganic fiber material is a mixture of rockwool and asbestos fiber.

10. A porous insulating material consisting substantially of an asbestos-containing mineral fiber mixture having a preponderant asbestos content by weight and forming a dry foam whose specific gravity is between 0.002 and 0.03 g./cm.$^3$, said dry foam being non-inflammable, and bulk-elastic.

11. A porous insulating material consisting substantially only of a dry bulk-elastic foam of fibrous asbestos and having a specific gravity between 0.002 and 0.03 g./cm.$^3$ and a temperature range of elastic deformation which comprises the range of $-100°$ to $+550°$ C.

12. A porous insulating material consisting substantially of a dry bulk-elastic foam of fibrous mineralic material predominantly composed of asbestos and having a specific gravity between about 0.005 and about 0.01 g./cm.$^3$.

13. The method according to claim 5, wherein said fiber material consists substantially all of asbestos and which comprises solidifying the molded foam by subjecting it to drying at a temperature of 40 to 100° C. and to subsequent heating at a minimum temperature of approximately 200° C., whereby the resulting elastic body consists substantially only of asbestos.

14. The method according to claim 1, which comprises modifying the solidification of the dispersion by adding thereto a synthetic plastic in a quantity sufficient to make the products hydrophobic.

15. The method according to claim 1, which comprises modifying the solidification of the dispersion by adding silicone resin to the dispersion in a quantity sufficient to make the products hydrophobic.

16. The method according to claim 1, which comprises modifying the solidification of the dispersion by adding melamine-formaldehyde polycondensate to the dispersion in a quantity sufficient to make the products hydrophobic.

References Cited

UNITED STATES PATENTS 3,338,994   8/1967   Heron _____ 264—41

MURRAY TILLMAN, Primary Examiner

W. J. BRIGGS, Sr., Assistant Examiner

U.S. Cl. X.R.

264—50; 162—153, 155; 260—2